United States Patent
Rolle et al.

(12) 
(10) Patent No.: US 6,413,625 B2
(45) Date of Patent: Jul. 2, 2002

(54) THERMOFORMABLE FOAM SHEETING FOR PRODUCING OPEN CONTAINERS

(76) Inventors: Jean-Claude Rolle, 15, rue Pierre-Alex, CH-1630 Bulle; Michel Pittet, Route de l'Ancien-Stand, CH-1680 Romont, both of (CH)

( * ) Notice: Subject to any disclaimer, the term of this patent is extended or adjusted under 35 U.S.C. 154(b) by 0 days.

(21) Appl. No.: 09/844,166

(22) Filed: Apr. 27, 2001

Related U.S. Application Data

(63) Continuation of application No. 09/951,268, filed on Jun. 9, 2000, now abandoned, which is a continuation of application No. 09/117,817, filed on Oct. 26, 1998, now abandoned, which is a continuation of application No. PCT/EP97/00420, filed on Jan. 31, 1997.

(30) Foreign Application Priority Data

Feb. 7, 1996 (CH) ................................. 318/96

(51) Int. Cl.$^7$ ................................. B32B 3/26
(52) U.S. Cl. ................ 428/316.6; 428/304.4; 428/314.4; 428/314.8
(58) Field of Search ........... 428/304.4, 314.4, 428/314.8, 316.6

(56) References Cited

U.S. PATENT DOCUMENTS

| | | |
|---|---|---|
| 3,871,897 A | 3/1975 | Ealding |
| 4,680,317 A | 7/1987 | Künel et al. |
| 5,149,579 A | 9/1992 | Park et al. |

FOREIGN PATENT DOCUMENTS

| | | |
|---|---|---|
| EP | 0 438 874 A2 | 7/1991 |
| EP | 0 458 731 A1 | 11/1991 |

*Primary Examiner*—Helen L. Pezzuto
(74) *Attorney, Agent, or Firm*—Oppedahl & Larson LLP

(57) ABSTRACT

The invention relates to a thermoformable sheeting consisting of a foam material or containing at least one layer of a foam material. The inventive sheeting is particularly applicable for thermoforming cups or trays for packaging and/or consuming food stuffs, by drawing or deep drawing the sheeting and expanding the foam material. The foam material of the inventive sheeting consists of a polypropylene blend containing between 50 and 100% of high melt strength polypropylene, has a density of 0.1 to 0.7 g/cm$^3$, preferably between 0.25 and 0.5 g/cm$^3$, and a cell number of from greater than 300 to 3000 cells per mm$^3$, preferably between 800 and 2500 cells per mm$^3$. The inventive sheeting can be drawn with a high drawing ration (e.g. 1.5) and expanded to be formed into containers even with difficult shapes, whereby no drawing problems arise and the containers produced show a homogeneous opaqueness.

10 Claims, No Drawings

THERMOFORMABLE FOAM SHEETING FOR PRODUCING OPEN CONTAINERS

This application is a continuation of application Ser. No. 09/951,268 (filed Jun. 9, 2000) abandoned, which is a continuation of application Ser. No. 09/117,817 (filed Oct. 26, 1998, abandoned) which is a 371 of PCT/EP97/00420 (filed Jan. 31, 1997, the application being published in language other than English under PCT Article 21(2)).

The invention is in the field of the packaging industry and relates to a thermoformable foam sheeting according to the generic part of the first independent claim, which sheeting consists of a thermoformable and expandable foam material or contains at least one layer of such a material.

Open containers, such as e.g. trays or cups often used for packaging and/or for consuming food stuffs are usually produced by drawing or deep drawing a piece of flat sheeting made of a thermoformable plastic material. Such open containers have a bottom wall and a side wall or side walls. The sheeting is usually thermoformed between a pair of forming tools, i.e. between a female tool with a recess over which the preheated sheeting is positioned and a male tool movable into the recess of the female tool thereby drawing the sheeting.

The use of a sheeting consisting of a foamed material or containing at least one layer of a foamed material is advantageous for making such containers because a foam sheet or a container made of such a sheet unit is usually stiffer than the corresponding solid material with the same weight per area. Sheeting and containers consisting at least partly of foamed material are opaque. The containers need a minimum mechanical strength according to their application and they are the better accepted, the more homogeneous their opaqueness and the smoother and shinier their surface is.

A further advantage of producing the open containers of a sheeting which consists of a foamed material or contains at least one layer of such a material, is the possibility of expanding specific parts of the container walls by applying a reduced pressure to the foam when it is in a thermoformable state, whereby the gas trapped in the foam expands, and by cooling down the foam when still under reduced pressure. Such processes are described e.g. in the publications U.S. Pat. No. 3,846,526 or JP-60192615. Furthermore, a method and an apparatus for drawing and expanding foam sheeting to form open containers is described in a co-pending application (same filing date as the present application).

According to the co-pending application the containers are formed with the help of a male tool moving into the recess of a female tool and thereby drawing the preheated sheeting positioned over the recess of the female tool. During the movement of the male tool the pressure on at least one side of the sheeting is reduced such that it reaches a value (expansion pressure) below ambient pressure which is low enough for expanding the foam material when the male tool reaches its end position or immediately afterwards. The tools are then kept in the end position and expansion pressure is maintained until the sheeting has cooled down to a temperature below its plastication temperature. Then the formed container is demolded. Before the moving male tool contacts the preheated sheeting, the sheeting may be prestretched by applying a pressure difference to it (lower pressure on the female tool side). Such prestretching is preferable in particular when producing containers by deep drawing (drawing ratio>1) and/or containers with a difficult shape (not round bottom wall, steep side walls).

With the method described in the last paragraph and using tools which have, for removing air from between the sheeting and the tool surface, a pattern of openings on at least those parts of their surface which are to form the side walls of the container (as described in a further co-pending application with the same application date as the present application), it is possible to produce in a minimum cycle time from a sheeting at least partly consisting of foamed material, open containers with a wall thickness and wall density which are primarily determined by the mechanical properties the container is to have. This means that the container wall may have, according to the degree of drawing and of expansion a varying thickness and in particular a varying density.

Using known sheetings consisting of or containing e.g. polysterene or polypropylene foam for producing open containers according to the above described method, may create problems in that on the, produced containers areas or varying degree of drawing and/or expansion show optically or even lead to mechanical faults which happens in, particular when the cycle time is short and/or the drawing ratio is high or the shape of the container is difficult, as are e.g. container shapes with a non-round bottom wall and/or with very steep side walls.

It is therefore the object of the invention to create a sheeting, consisting of a foamed material or containing at least one layer of a foamed material which sheeting has good drawing, characteristics and an opaqueness which varies little with density such that the sheeting can be processed using the method of the co-pending application in particular with very short cycle times and with high drawing, ratios and difficult container, shapes resulting in containers which are mechanically and estheticly of good quality. In addition, the sheeting as well as the containers made from the sheeting are to be easily recyclable and compatible with food stuffs of a variety as wide as possible (solid and liquid, hot and cold etc.).

This object is achieved by the sheeting as defined by the claims.

For fulfilling the condition of the recyclability and the food compatibility, the inventive sheeting consists basically of polypropylene. This means it consists fully of a polypropylene foam or contains at least one layer of polypropylene foam and contains a further layer or further layers e.g. of solid polypropylene or of other thermoformable materials, e.g. barrier materials.

The opaqueness of a plastic foam material is due to light scattering on the cell walls. The finer the arrangement of these cell walls is, the more times light falling into the material is scattered and the more opaque does the material appear. It is found that the finer the arrangement of the cell walls, the less does the appearance of the material change when drawn and/or expanded to quite a high degree. It is found also that the finer the arrangement of the cell walls the better are the drawing characteristics of the foam. This is due to the fact, that the occurrence of cells which are large enough for locally changing the drawability of the foam to a considerable degree and for being torn open upon drawing, gets more probable as the cell size increases, i.e. as the fineness of the cell wall structure decreases.

The measure for the fineness of the cell wall structure in a plastic foam material is the cell number (cells per $mm^3$). It is found that sheetings with polypropylene foams having a cell number which is higher than 300 cells per $mm^3$ and processed in the method according to the co-pending application give good quality containers for a relatively low drawing ratio (container depth divided by diameter of opening: between 0.5 and 1, depending on container shape and expansion ratio). Sheeting with polypropylene foam with a cell number of up to 3000 cells per mm³ gives good quality containers for drawing ratios of 0.8 to 1.5 (depending on container shape and expansion ratio). For the production of containers such as cups and trays for packaging and/or consuming food stuffs in a drawing process as described in the co-pending application, sheeting with polypropylene foam having a cell number of 800 to 2500 cells per mm³, preferably of 1000 to 2000 cells per mm³, is very suitable.

The polypropylene foam of the inventive sheeting, has a density of 0.1 to 0.7 gr/cm³, preferably of 0.25 to 0.5 gr/cm³, even more preferably of 0.36 to 0.50 gr/cm³. The sheeting has a thickness of 0.5 to 3 mm, preferably of 1 to 2 mm and even more preferably of 1.2 to 1.6 mm.

If, depending on the density of the polypropylene foam and on the thickness of the sheeting to be made, a polypropylene blend containing between 50 and 100% of high melt strength polypropylene with a melt strength of ca. 24 cN is used, extrusion of a sheeting with the above mentioned characteristics is possible without problem. High melt strength polypropylene (polypropylene with long chain branching) is available on the market as homopolymer or as copolymer.

The higher the melt strength of polypropylene blend (i.e. the higher its content of high melt strength polypropylene), the easier it is to produce good quality sheeting with the required cell numbers. However, because a high percentage of high melt strength polypropylene is not only an economic drawback but also results in containers with rather brittle walls, it is advantageous to lower the percentage of high melt strength polypropylene as much as possible towards 50%, by adding other types of polypropylene (homo- or copolymers) thereby lowering the melt strength of the blend to as low as 15 cN, preferably to between 18 and 20 cN.

A sheeting applicable in the thermoforming method according to the co-pending application for producing cups and trays for packaging and/or consuming food which cups and trays have a mechanical stability suitable for this purpose, preferably consists of or contains a polypropylene foam containing 60 to 90%, preferably 60 to 80% of high melt strength polypropylene.

For producing by extrusion the sheeting consisting of or containing the polypropylene foam, a solid or gaseous blowing agent is added to the polymer blend in a known manner. Furthermore other known additives for improving the extrusion process may be added in known concentrations as well as e.g. pigments for coloring the foam material.

The cell number of an extruded foam material is not only dependent on the composition of the extruded polymer and on the additives used but also on the extrusion parameters. Therefore, for producing a sheeting with a polypropylene foam of the composition given above and having a cell number within a predetermined range, the appropriate extrusion parameters are to be determined by experiment.

EXAMPLE sheeting:
polypropylene blend: 80% of high melt strength polypropylene, 20% of polypropylene copolymer
additives: 1,1% blowing agent
thickness of foam: 1.4 mm
density: 0.43 g/cm³
cell number: 1450 cells per mm³
thermoforming process with prestretching:
width of cavity: 1.2 mm
sheet temperature: $\geqq 160°$ C.
expansion pressure: $\leqq 0.2$ bar (absolute)
forming time (prestretching, drawing and expansion): 1.8 sec
container made from the sheeting:
round cup: diameter of opening: 75 mm
    depth: 80 mm
    wall thickness: 1–1.2 mm

We claim:

1. Thermoformable sheeting which sheeting consists of a foamed propylene homopolymer or copolymer or contains at least one layer of such a foam and which sheeting is applicable for producing open containers by drawing or deep drawing the sheeting and expanding under reduced pressure the gas trapped in the foam when the foam is in a thermoformable state, characterized in that the foamed propylene homopolymer or copolymer contains between 60 and 90% high melt strength propylene homopolymer or copolymer and at least one further propylene homopolymer or copolymer, has a density of 0.1 to 0.7 g/cm³ and a cell number of more than 300 cells per mm³.

2. Thermoformable sheeting according to claim 1, characterized in that the foam has a cell number of 800 to 2500 cells per mm³.

3. Thermoformable sheeting according to claim 1, characterized in that the foam has a cell number of 1000 to 2000 cells per mm³.

4. Thermoformable sheeting according to claim 1, characterized in that the foamed propylene homopolymer or copolymer consists of 60 to 80% of high melt strength propylene homopolymer or copolymer and of at least one further propylene homopolymer or copolymer.

5. Thermoformable sheeting according to claim 1, characterized in that the foamed propylene homopolymer or copolymer has a density of 0.25 to 0.5 gr/cm³.

6. Thermoformable sheeting according to claim 1, characterized in that the foamed propylene homopolymer or copolymer has a density of 0.36 to 0.50 gr/cm³.

7. Thermoformable sheeting according to claim 1, characterized in that the sheeting, or the at least one foam layer has a thickness of between 0.5 and 3 mm.

8. Thermoformable sheeting according to claim 1, characterized in that the sheeting or the at least one foam layer has a thickness of between 1 to 2 mm.

9. Thermoformable sheeting according to claim 1, characterized in that the sheeting or at least one foam layer has a thickness of between 1.2 to 1.6 mm.

10. Thermoformable sheeting according to claim 1, characterized in that it has a thickness of 1.4 mm and consists of a foamed propylene homopolymer or copolymer containing 80% of high melt strength propylene homopolymer or copolymer and has a density of 0.43 g/cm³ and a cell number of 1450 cells per mm³.

* * * * *